(12) United States Patent
Itoya et al.

(10) Patent No.: US 11,214,494 B2
(45) Date of Patent: Jan. 4, 2022

(54) SPINEL COMPOUND OXIDE PARTICLE, METHOD FOR PRODUCING THE SAME, RESIN COMPOSITION INCLUDING SPINEL COMPOUND OXIDE PARTICLE, AND MOLDED ARTICLE

(71) Applicant: DIC Corporation, Tokyo (JP)

(72) Inventors: Kazuo Itoya, Sakura (JP); Masaki Iida, Sakura (JP); Jian-Jun Yuan, Sakura (JP); Yasuyo Yoshimoto, Sakura (JP); Hironobu Oki, Sakura (JP); Masamichi Hayashi, Sakura (JP)

(73) Assignee: DIC Corporation, Tokyo (JP)

( * ) Notice: Subject to any disclaimer, the term of this patent is extended or adjusted under 35 U.S.C. 154(b) by 96 days.

(21) Appl. No.: 16/611,621

(22) PCT Filed: May 1, 2018

(86) PCT No.: PCT/JP2018/017393
§ 371 (c)(1),
(2) Date: Nov. 7, 2019

(87) PCT Pub. No.: WO2018/207679
PCT Pub. Date: Nov. 15, 2018

(65) Prior Publication Data
US 2020/0062607 A1    Feb. 27, 2020

(30) Foreign Application Priority Data

May 11, 2017 (JP) .............................. JP2017-094658

(51) Int. Cl.
| | |
|---|---|
| C01F 7/00 | (2006.01) |
| C01F 7/16 | (2006.01) |
| C01G 9/02 | (2006.01) |
| C01G 39/02 | (2006.01) |
| C01G 51/04 | (2006.01) |
| C08K 3/22 | (2006.01) |
| C08L 101/00 | (2006.01) |

(52) U.S. Cl.
CPC ................ *C01F 7/166* (2013.01); *C01G 9/02* (2013.01); *C01G 39/02* (2013.01); *C01G 51/04* (2013.01); *C08K 3/22* (2013.01); *C08L 101/00* (2013.01); *C01P 2002/32* (2013.01)

(58) Field of Classification Search
CPC .... C01G 51/006; C01G 9/006; C01G 39/006; C01F 7/002; C01F 7/166; C01F 11/02; C01F 11/04; C01F 11/06; C08K 2003/2206; C08K 2003/2227; C08K 2003/2255; C08K 2003/2289; C08K 2003/2296
See application file for complete search history.

(56) References Cited

U.S. PATENT DOCUMENTS

| | | | |
|---|---|---|---|
| 6,524,996 B1* | 2/2003 | Bender | ................. B01J 23/005 502/346 |
| 2018/0079654 A1* | 3/2018 | Oki | ......................... C30B 29/22 |
| 2018/0171137 A1* | 6/2018 | Woo | ........................ C08L 67/00 |

FOREIGN PATENT DOCUMENTS

| | | | |
|---|---|---|---|
| JP | 2002-194350 A | | 7/2002 |
| JP | 2016-135841 | * | 7/2016 |
| JP | 5995130 | * | 9/2016 |
| JP | 2016-222501 | * | 12/2016 |
| JP | 60-61173 | * | 1/2017 |
| WO | 2013/039103 | * | 3/2013 |
| WO | 2016/024624 | * | 2/2016 |
| WO | 2016/175572 | * | 11/2016 |

* cited by examiner

*Primary Examiner* — Steven J Bos
(74) *Attorney, Agent, or Firm* — Locke Lord LLP; James E. Armstrong, IV; Nicholas J. DiCeglie, Jr.

(57) ABSTRACT

A spinel compound oxide particle includes metallic atoms, aluminum atoms, oxygen atoms, and molybdenum atoms, wherein the metallic atoms are selected from the group consisting of zinc atoms, cobalt atoms, and strontium atoms, and a crystallite size in a [111] plane is 100 nm or more. Included are a step (1) of firing a first mixture including a molybdenum compound and a metallic-atom-containing compound or a first mixture including a molybdenum compound, a metallic-atom-containing compound, and an aluminum compound to prepare an intermediate; and a step (2) of firing, at a temperature higher than a temperature selected in the step (1), a second mixture including the intermediate or a second mixture including the intermediate and an aluminum compound.

12 Claims, No Drawings

SPINEL COMPOUND OXIDE PARTICLE, METHOD FOR PRODUCING THE SAME, RESIN COMPOSITION INCLUDING SPINEL COMPOUND OXIDE PARTICLE, AND MOLDED ARTICLE

TECHNICAL FIELD

The present invention relates to a spinel compound oxide particle, a method for producing the spinel compound oxide particle, a resin composition including the spinel particle, and a molded article.

BACKGROUND ART

There has been a demand for devices having a smaller size, a smaller weight, and higher performance. With this demand, semiconductor devices having a higher degree of integration and a higher capacitance have been provided. As a result, constituent members of devices generate larger amounts of heat. Thus, there has been a demand for improvements in the heat dissipation function of devices.

In order to improve the heat dissipation function of devices, there is a known method such as a method of imparting thermal conductivity to insulating members, more specifically, a method of adding inorganic fillers to resins for forming insulating members. In this case, examples of the inorganic fillers employed include alumina (aluminum oxide), boron nitride, aluminum nitride, magnesium oxide, and magnesium carbonate.

In recent years, devices having a smaller size, a smaller weight, and higher performance have been increasingly provided, and there has been a demand for an inorganic filler having high thermal conductivity.

In general, the spinel, which is a mineral represented by a chemical composition of $MgAl_2O_4$, is used as jewelry and also applied to, from the viewpoint of the porous structure and easiness of modification, catalyst carriers, adsorbents, photocatalysts, optical materials, and heat-resistant insulating materials, for example. The spinel compound oxide is a particle that has an $AB_2O_4$ compound (where each of A and B is a metallic element) composition, which is different in chemical composition from spinel ($MgAl_2O_4$), but that has a crystalline structure of the same type as in spinel. The spinel structure is stable over wide temperature regions and is stable even in environments at relatively high temperatures, and hence is used for, for example, sealing materials used at high temperatures. Porous spinel oxide is widely used as catalysts or adsorbents or carriers constituting the foregoing.

For example, Patent Literature 1 describes electroluminescent materials including, as base materials, aluminates having the $AB_2O_4$ compound composition where the metallic atom B is aluminum (A is magnesium, calcium, strontium, or zinc).

CITATION LIST

Patent Literature

PTL 1: Japanese Unexamined Patent Application Publication No. 2002-194350

SUMMARY OF INVENTION

Technical Problem

As described above, the spinel compound oxide particles have been applied to catalyst carriers, adsorbents, and heat-resistant insulating materials, for example, but are not expected to be applied to inorganic fillers having thermal conductivity. This is because alumina has often been used from the viewpoint of costs, and spinel compound oxide particles considered as having lower thermal conductivity than the alumina have not been expected to be used as thermal conductive inorganic fillers.

Accordingly, an object of the present invention is to provide a spinel compound oxide particle having high thermal conductivity.

Solution to Problem

In order to achieve the above-described object, the inventors of the present invention performed thorough studies. As a result, they have found that the above-described object can be achieved when a spinel compound oxide particle is provided so as to have a larger crystallite size in a predetermined crystal plane. Thus, the present invention has been accomplished.

Specifically, the present invention relates to a spinel compound oxide particle including: metallic atoms, aluminum atoms, oxygen atoms, and molybdenum atoms, wherein the metallic atoms are selected from the group consisting of zinc atoms, cobalt atoms, and strontium atoms, and a crystallite size in a [111] plane is 100 nm or more.

Advantageous Effects of Invention

The present invention provides a spinel compound oxide particle having much higher thermal conductivity than existing one.

DESCRIPTION OF EMBODIMENTS

Hereinafter, embodiments for practicing the present invention will be described in detail.

<Spinel Compound Oxide Particle>

An embodiment of the present invention provides a spinel compound oxide particle including a spinel compound oxide including metallic atoms, aluminum atoms, and oxygen atoms, and molybdenum disposed on the surface of and/or within the spinel compound oxide. In this case, the spinel compound oxide has, in a [111] plane, a crystallite size of 100 nm or more. In the present invention, the spinel compound oxide means an oxide in which the magnesium atom Mg of spinel is substituted with another metallic atom, specifically a metallic atom selected from the group consisting of a zinc atom, a cobalt atom, and a strontium atom, and this definition does not encompass spinel itself represented by a chemical composition of $MgAl_2O_4$.

Incidentally, in this Description, the "spinel compound oxide particle" does not encompass spinel itself, but encompasses all particles that include spinel compound oxide and molybdenum. In this case, as described later, the molybdenum may be disposed on the surface of the spinel compound oxide. On the other hand, the molybdenum may be disposed within the spinel compound oxide. Incidentally, the molybdenum may be disposed on the surface of and within the spinel.

The molybdenum is disposed on the surface of and/or within the spinel compound oxide. The phrase "disposed on the surface" means that, on the surface of the spinel compound oxide particle, molybdenum is present by adhesion, coverage, bonding, or another similar means. On the other hand, the phrase "disposed within" means being incorporated into spinel compound oxide crystals or being present in spaces such as defects of spinel compound oxide crystals. The feature of being incorporated into spinel compound oxide crystals means that atoms constituting spinel compound oxide are at least partially substituted with molybdenum, and the molybdenum is contained as a portion of spinel compound oxide crystals. In this case, the atom of spinel compound oxide substituted is not particularly limited, and may be a metallic atom, an aluminum atom, an oxygen atom, or another atom.

The spinel compound oxide particles may have the shape of, for example, a polyhedron, a sphere, an ellipse, a column, a polygonal column, a needle, a rod, a plate, a disk, a flake, or a scale. Of these, from the viewpoint of high dispersibility in resin, preferred is the shape of a polyhedron, a sphere, an ellipse, or a plate, more preferred is the shape of a polyhedron or a sphere. Incidentally, the "polyhedron" is normally a hexa- or higher hedron, preferably an octa- or higher hedron, more preferably a decahedron to a triacontahedron.

The spinel compound oxide particles preferably have an average particle size of 0.1 to 1000 μm, more preferably 0.2 to 100 μm, still more preferably 0.3 to 80 μm, particularly preferably 0.4 to 60 μm. In the case where the spinel compound oxide particles have an average particle size of 0.1 μm or more, mixing of the particles with resin provides a resin composition that does not have an excessively high viscosity, which is preferred. On the other hand, in the case where the spinel compound oxide particles have an average particle size of 1000 μm or less, mixing of the particles with resin and molding of the resultant resin composition provide a molded article that can have a smooth surface or has good mechanical properties, which is preferred. Incidentally, in this Description, the "average particle size" is a value obtained in the following manner: the particle sizes of 100 arbitrary particles in an image obtained with a scanning electron microscope (SEM) are measured, and calculated. In this case, the "particle size" means the maximum length among distances between two points on the contour of a particle.

The spinel compound oxide particles preferably have a specific surface area of 10 m$^2$/g or less, more preferably 8 to 0.001 m$^2$/g, still more preferably 5 to 0.01 m$^2$/g. When the spinel compound oxide particles have a specific surface area of 10 m$^2$/g or less, the particles have high surface smoothness, and can be suitably dispersed in, for example, resin, which is preferred. Incidentally, in this Description, the "specific surface area" means BET specific surface area, and employs values obtained by a nitrogen gas adsorption/desorption method.

The spinel compound oxide particles preferably have a thermal conductivity of 20 W/(m·K) or more, more preferably 30 W/(m·K) or more, still more preferably 40 W/(m·K) or more. When the spinel compound oxide particles have a thermal conductivity of 20 W/(m·K) or more, the resin molded article has higher thermal conductivity, which is preferred.

[Spinel Compound Oxide Particle]

In the present invention, the spinel compound oxide particle includes the above-described specified metallic atoms, aluminum atoms, oxygen atoms, and additionally molybdenum described later.

In the present invention, the spinel compound oxide particle has, in a [111] plane, a crystallite size of 100 nm or more, preferably 120 nm or more, more preferably 150 nm or more, still more preferably 200 nm or more. The [111] plane is a main crystalline domain of spinel. The size of the crystalline domain in the [111] plane corresponds to the crystallite size in the [111] plane. The larger the crystallite size, the higher the denseness and crystallinity of particles. This means the absence of disordered regions causing scattering of phonons, and hence high thermal conductivity. Incidentally, the crystallite size in the plane of spinel can be controlled by appropriately setting conditions of a production method described later. In this Description, the value of the "crystallite size in the [111] plane" employs a value calculated, using the Scherrer equation, from the half width of a peak measured by X-ray diffractometry (XRD) and attributed to the [111] plane.

(Metallic Atoms)

In the spinel compound oxide according to the present invention, metallic atoms other than aluminum atoms and molybdenum atoms are selected from the group consisting of zinc atoms, cobalt atoms, and strontium atoms, and the metallic atom content is not particularly limited; however, when the metallic atoms are represented by M and the spinel is represented by a structural formula of $M_xAl_2O_z$, x is preferably in the range of 0.8 to 1.2, more preferably in the range of 0.9 to 1.1. Incidentally, in this Description, the metallic atom content of the spinel compound oxide employs a value measured by X-ray fluorescence element analysis (XRF).

(Aluminum Atoms)

The metallic atom content of the spinel is not particularly limited; however, when the spinel compound oxide is represented by a structural formula $MAl_yO_z$, x is preferably in the range of 1.8 to 2.2, more preferably in the range of 1.9 to 2.1. Incidentally, in this Description, the aluminum atom content of the spinel compound oxide employs a value measured by X-ray fluorescence element analysis (XRF).

(Oxygen Atoms)

The oxygen atom content of the spinel compound oxide is not particularly limited; however, when the spinel compound oxide is represented by a structural formula $M_xAl_yO_z$, z is preferably in the range of (x+y+1.2) to (x+y+0.8), more preferably in the range of (x+y+1.1) to (x+y+0.9).

(Other Atoms)

In the spinel compound oxide according to the present invention, the metallic atoms other than aluminum atoms and molybdenum atoms are selected from the group consisting of zinc atoms, cobalt atoms, and strontium atoms; in addition, other atoms may be contained in the spinel compound oxide as long as they do not inhibit advantages of the present invention. Specific examples include nickel, iron, manganese, titanium, zirconium, calcium, and yttrium. Such other atom species may be included alone or in combination of two or more thereof.

In the spinel compound oxide, the content of other atoms, which are other than aluminum atoms, molybdenum atoms, and metallic atoms selected from the group consisting of zinc atoms, cobalt atoms, and strontium atoms, is preferably 10 mol % or less, more preferably 5 mol % or less, most preferably 2 mol % or less.

<Molybdenum>

Molybdenum can be contained due to a production method described later.

Incidentally, the molybdenum encompasses molybdenum in a molybdenum-containing compound described later.

The molybdenum content of the spinel compound oxide particle is not particularly limited, but is preferably, relative to the spinel compound oxide, 20 mol % or less, more preferably 10 mol % or less, particularly preferably 5 mol % or less where the spinel compound oxide crystals have high denseness. Incidentally, in this Description, the molybdenum content of the spinel compound oxide employs a value measured with an X-ray fluorescence analyzer.

<Method for Producing Spinel Compound Oxide Particle>

A method for producing a spinel compound oxide particle includes a step (1) of firing a first mixture (A-1) including a molybdenum compound and a metallic-atom-containing compound or a first mixture (A-2) including a molybdenum compound, a metallic-atom-containing compound, and an aluminum compound to prepare an intermediate. This step (1) is performed at a firing temperature lower than a temperature selected in a step (2) described later.

[Step of Preparing Intermediate]
(First Mixture)

The first mixture includes a molybdenum compound and a metallic-atom-containing compound as essential components.

The first mixture used in the production method according to the present invention can be broadly divided into the first mixture (A-1) including, as element sources of raw materials of the spinel compound oxide, a molybdenum compound and a metallic-atom-containing compound alone, and the first mixture (A-2) including a molybdenum compound, a metallic-atom-containing compound, and an aluminum compound.

Molybdenum Compound

The molybdenum compound is not particularly limited. Examples of the molybdenum compound include metallic molybdenum, molybdenum oxide, molybdenum molybdenum sulfide, sodium molybdate, potassium molybdate, calcium molybdate, ammonium molybdate, $H_3PMo_{12}O_{40}$, and $H_3SiMo_{12}O_{40}$. In this case, the molybdenum compounds encompass isomers. For example, molybdenum oxide may be molybdenum(IV) dioxide ($MoO_2$) or molybdenum(VI) trioxide ($MoO_3$). Of these, preferred are molybdenum trioxide, molybdenum dioxide, and ammonium molybdate, more preferred is molybdenum trioxide.

The above-described molybdenum compounds may be used alone or in combination of two or more thereof.

A molar ratio (molybdenum element/metallic element) of the molybdenum element of the molybdenum compound to the metallic element of the metallic-atom-containing compound is preferably 0.01 to 2.0, more preferably 0.1 to 1.8. When the molar ratio is 0.01 or more, crystal growth can suitably proceed, which is preferred. On the other hand, when the molar ratio is 2.0 or less, generation of, a by-product in the firing step described later, alumina having a high proportion of α-alumina can be effectively suppressed or prevented, which is preferred.

Metallic Compound

The metallic-atom-containing compound is not particularly limited; however, from the viewpoint of having high reactivity and providing a spinel compound oxide particle that can have a large crystallite size, preferred are metal oxides, metal hydroxides, metal carbonates, metal nitrates, and metal acetates in which the metals correspond to metallic atoms selected from the group consisting of zinc, cobalt, and strontium. Incidentally, the above-described metallic compounds may be used alone or in combination of two or more thereof.

(Firing of First Mixture)

A metallic-atom-containing compound and a molybdenum compound can be fired to obtain a metal molybdate compound.

In this case, the firing temperature is not particularly limited as long as the metal molybdate compound is obtained, but is preferably 200 to 2000° C., more preferably 300 to 1500° C., still more preferably 400 to 1000° C. When the firing temperature is 200° C. or more, the reaction of the molybdenum compound and the metallic-atom-containing compound efficiently occurs, which is preferred. On the other hand, when the firing temperature is 2000° C. or less, the firing is industrially easily performed, which is preferred.

The firing time is also not particularly limited, but is preferably 0.1 to 100 hours, more preferably 1 to 20 hours.

After the firing, temporary cooling may be performed to isolate the metal molybdate compound, or, directly, a firing step described later may be performed.

Intermediate

The intermediate obtained by firing the first mixture includes the metal molybdate compound as an essential component. In a case where the first mixture is the mixture (A-1), the metal molybdate compound is substantially contained as a main component. In a case where the first mixture is the mixture (A-2), the metal molybdate compound and aluminum molybdate are substantially contained as main components.

(Metal Molybdate Compound)

The metal molybdate compound is zinc molybdate, cobalt molybdate, or strontium molybdate. The metal molybdate compound serves as, in a firing step described later, the source of molybdenum vapor, and also has a function of providing metallic atoms that form, together with aluminum atoms of the aluminum compound, crystals.

The metal molybdate compound includes metallic atoms that are zinc atoms, cobalt atoms, or strontium atoms, molybdenum atoms, and oxygen atoms, and is generally represented by $MMoO_4$.

Alternatively, the metal molybdate compound may have another composition. For example, when the above-described molar ratio of the molybdenum element to the metallic element is not 1:1, after the firing, an excess amount of an unreacted metallic compound or molybdenum compound is present. This case provides a mixture of the metal molybdate compound and the metallic compound or the molybdenum compound.

The metal molybdate compound may include other atoms.

(Aluminum Molybdate)

The aluminum molybdate includes an aluminum atom, a molybdenum atom, and an oxygen atom, and is generally represented by $Al_x(MoO4)_y$, where x and y are each an integer or a small number of 1 or more. The aluminum molybdate may be decomposed to form alumina having a high proportion of α-alumina.

The production method according to the present invention further includes a step (2) of firing a second mixture including the intermediate and an aluminum compound to produce a spinel compound oxide particle. In the case of using the mixture (A-2) in the step (1), the second mixture including the intermediate is used in the step (2). In the case of using the mixture (A-1) in the step (1), the second mixture including the intermediate and an aluminum compound is used in the step (2). The step (2) is a step of firing the second mixture at a temperature higher than the temperature selected in the step (1) to obtain a spinel particle.

[Spinel Compound Oxide Firing Step]

Spinel including a plurality of metallic components tends to undergo generation of a defective structure or the like during a firing process, so that it has been difficult to accurately control the crystal structure. However, by firing a metal molybdate compound and an aluminum compound, molybdenum oxide functions as a flux agent, and the spinel crystal structure composed of the metallic element, aluminum, and oxygen can be accurately controlled. As a result, an increase in the crystallite size in the [111] plane is achieved, to produce a spinel compound oxide particle having high thermal conductivity.

Existing synthesis of spinel compound oxide particles normally involves firing at high temperatures. Thus, in consideration of growth of particles, it has been difficult to obtain spinel compound oxide particles having high thermal conductivity and an average particle size of 1000 µm or less, in particular, 100 µm or less. For this reason, in the existing production method, large spinel compound oxide particles need to be synthesized and then pulverized into powder. By contrast, in the production method according to this embodiment, use of the metal molybdate compound enables production of spinel compound oxide particles having high thermal conductivity, and an average particle size of 1000 µm or less, in particular, 100 µm or less.

Incidentally, the crystallite size of the spinel compound oxide particle can be mainly controlled with the amount of molybdenum (serving as a flux agent) added, specifically the above-described molar ratio (molybdenum element/metallic element) of the molybdenum element to the metallic element. This is because the molybdenum compound functions as flux to melt raw materials that are the metallic compound and/or the aluminum compound, to thereby cause crystallization of MAl2O4.

The average particle size of the spinel compound oxide particles can also be mainly controlled with the amount of molybdenum (serving as a flux agent) added, specifically, the above-described molar ratio (molybdenum element/metallic element) of the molybdenum element to the metallic element. This is also because, as in the above-described control of the crystallite size, the molybdenum compound functions as flux, so that an appropriate change of the amount of use enables control on the state of melting of the raw materials.

Second Mixture

The second mixture includes the intermediate and an aluminum compound. When an aluminum compound in an amount sufficient for the reaction of forming spinel is included in the first mixture, the second mixture is identical to the intermediate except for a case where another compound is added as described later.

In the step (1), in the case of using the mixture (A-2), the second mixture employed is a second mixture including the intermediate. In the step (1), in the case of using the mixture (A-1), the second mixture employed is a second mixture including the intermediate and an aluminum compound.

Metal Molybdate Compound

The metal molybdate compound employed may be a compound prepared by the above-described precursor preparation step, or may be a commercially available product.

Aluminum Compound

The aluminum compound is not particularly limited and examples include aluminum derivatives such as metallic aluminum, alumina (aluminum oxide), aluminum hydroxide, aluminum sulfide, aluminum nitride, aluminum fluoride, aluminum chloride, aluminum bromide, and aluminum iodide; aluminum oxoacid salts such as aluminum sulfate, aluminum sodium sulfate, aluminum potassium sulfate, aluminum ammonium sulfate, aluminum nitrate, aluminum perchlorate, aluminum aluminate, aluminum silicate, and aluminum phosphate; aluminum organic salts such as aluminum acetate, aluminum lactate, aluminum laurate, aluminum stearate, and aluminum oxalate; alkoxy aluminum such as aluminum propoxide and aluminum butoxide; aluminum-magnesium-containing compounds such as spinel, spinel precursors, magnesium aluminate, hydrotalcite, and magnesium aluminum isopropoxide; and hydrates of the forgoing. Of these, preferred are aluminum oxide, aluminum hydroxide, aluminum chloride, aluminum sulfate, aluminum nitrate, and hydrates of the forgoing; more preferred are aluminum oxide, aluminum hydroxide, and spinel precursors.

Incidentally, the above-described aluminum compounds may be used alone or in combination of two or more thereof.

The molar ratio (aluminum element/metallic element) of the metallic element of the metal molybdate compound to the aluminum element of the aluminum compound is preferably in the range of 2.2 to 1.8, more preferably in the range of 2.1 to 1.9. When the molar ratio is in the range of 2.2 to 1.8, a spinel compound oxide particle having a large crystallite size in the [111] plane and having high thermal conductivity can be synthesized, which is preferred.

Firing of Second Mixture

The second mixture including the intermediate and an aluminum compound is fired at a temperature higher than the temperature selected in the step (1), to thereby obtain a spinel compound oxide particle.

The firing temperature is not particularly limited as long as a desired spinel compound oxide particle is obtained, but is preferably 800 to 2000° C., more preferably 1200 to 1600° C. When the firing temperature is 800° C. or more, a spinel compound oxide particle having a large crystallite size in the [311] plane can be obtained in a short time, which is preferred. On the other hand, when the firing temperature is 2000° C. or less, the particle size of the spinel is easily controlled, which is preferred.

The firing time is not particularly limited, but is preferably 0.1 to 1000 hours, more preferably 3 to 100 hours. When the firing time is 0.1 hours or more, a spinel compound oxide particle having a large crystallite size in the [311] plane can be obtained, which is preferred. On the other hand, when the firing time is 1000 hours or less, a reduction in the production costs can be achieved, which is preferred.

The firing atmosphere may be the air atmosphere, an inert gas atmosphere such as nitrogen gas or argon gas, an oxygen atmosphere, an ammonia gas atmosphere, or a carbon dioxide atmosphere. In this case, from the viewpoint of production costs, the air atmosphere is preferred. Alternatively, in the case of simultaneously, for example, modifying the surfaces of the spinel compound oxide particles, the ammonia gas atmosphere is preferred.

The pressure during the firing is also not particularly limited; the firing may be performed under the standard pressure, or under a raised pressure, or under a reduced pressure, but, from the viewpoint of production costs, is preferably performed under the standard pressure.

The heating means is not particularly limited, but is preferably a kiln. Examples of the kiln usable in this case include a tunnel kiln, a roller-hearth kiln, a rotary kiln, and a muffle kiln.

[Firing Step Causing Solid Solution Formation and Crystal Formation]

According to an embodiment of the present invention, a third mixture of a metallic-atom-containing compound selected from the group consisting of zinc-containing compounds, cobalt-containing compounds, and strontium-containing compounds and an aluminum compound is fired in the presence of molybdenum atoms to cause solid solution formation and crystal formation to produce a spinel compound oxide particle.

The third mixture including the aluminum source and the molybdenum compound is fired to form temporarily an intermediate compound that is aluminum molybdate, to decompose the aluminum molybdate, and to vaporize the molybdenum compound, to thereby form a molybdenum-containing aluminum compound. In this case, vaporization of the molybdenum compound causes growth of crystals of the molybdenum-containing aluminum compound.

The solid solution formation and crystal formation are normally performed by, what is called, the solid-phase method. Specifically, the metallic-atom-containing compound selected from the group consisting of zinc-containing compounds, cobalt-containing compounds, and strontium-containing compounds and the aluminum compound react at the interfaces to form nuclei; metallic atoms selected from the group consisting of zinc atoms, cobalt atoms, and strontium atoms and/or aluminum atoms undergo solid-phase diffusion via the nuclei, to react with the aluminum compound and/or the metallic-atom-containing compound. This provides dense crystals, namely spinel compound oxide particles. In this case, in the solid-phase diffusion, the diffusion rate of metallic atoms into the aluminum compound is higher than the diffusion rate of aluminum atoms into the metallic-atom-containing compound, so that spinel compound oxide particles in which the shape of the aluminum compound is reflected tend to be obtained. Thus, the shape and average particle size of the aluminum compound may be appropriately changed to control the shape and average particle size of the spinel compound oxide particles.

The above-described solid-phase reaction is performed in the presence of molybdenum. Since spinel particles including a plurality of metallic components tend to undergo generation of a defective structure or the like during a firing process, it is difficult to accurately control the crystal structure. However, use of molybdenum enables control of the crystal structure of spinel compound oxide crystals. This enables an increase in the crystallite size in the [111] plane, so that spinel compound oxide particles having high thermal conductivity can be obtained. Incidentally, the solid-phase reaction is performed in the presence of molybdenum, so that the resultant spinel compound oxide particles can include molybdenum.

The above-described aluminum compound preferably includes molybdenum. In this case, the form of containing molybdenum in the molybdenum-containing aluminum compound is not particularly limited; however, as in spinel particles, examples include a form in which molybdenum is disposed on the surface of the aluminum compound by adhesion, coverage, bonding, or other similar means, a form in which molybdenum is incorporated into the aluminum compound, or a combination of the foregoing. In this case, examples of the "form in which molybdenum is incorporated into the aluminum compound" include a form in which the atoms constituting the aluminum compound are at least partially substituted with molybdenum, and a form in which molybdenum is disposed in spaces (encompassing, for example, spaces generated due to defects of the crystal structure) that can be present within aluminum compound crystals. Incidentally, in the form of substitution, the atoms constituting the aluminum compound and substituted are not particularly limited, and may be aluminum atoms, oxygen atoms, or other atoms.

Of the above-described aluminum compounds, the molybdenum-containing aluminum compound is preferably used, the aluminum compound in which molybdenum is incorporated is more preferably used.

The reason why the molybdenum-containing aluminum compound is preferred is not necessarily clarified, but the following mechanism is inferred. Specifically, molybdenum contained in the aluminum compound provides functions such as promotion of formation of nuclei at the solid-phase interfaces, and promotion of solid-phase diffusion of aluminum atoms and magnesium atoms, so that the solid-phase reaction of the aluminum compound and the magnesium compound more suitably proceeds. Specifically, as described later, the molybdenum-containing aluminum compound can have the functions of the aluminum compound and molybdenum. In particular, in the aluminum compound in which molybdenum is incorporated, molybdenum is disposed directly at the reaction site or in a region close to the reaction site, so that the effect due to molybdenum can be more effectively exerted. Incidentally, the above-described mechanism is merely inferred. Cases in which a mechanism different from the above-described mechanism provides desired advantages also fall within the technical scope.

The above-described molybdenum-containing aluminum compound can be prepared by the above-described flux method.

[Cooling Step]

The cooling step is a step of cooling the spinel compound oxide particle provided by crystal growth in the firing step, to achieve crystallization into a particulate form.

The cooling rate is also not particularly limited, but is preferably 1 to 1000° C./h, more preferably 5 to 500° C./h, still more preferably 50 to 100° C./h. When the cooling rate is 1° C./h or more, a reduction in the production time can be achieved, which is preferred. On the other hand, when the cooling rate is 1000° C./h or less, the firing container tends not to be cracked due to heat shock, and can be used for a long time, which is preferred. The cooling method is not particularly limited, and may be natural cooling or use of a cooling device.

<Resin Composition>

An embodiment of the present invention provides a resin composition including the spinel compound oxide particle and a resin. In this case, the composition may optionally further include, for example, a curing agent, a curing catalyst, a viscosity modifier, or a plasticizer.

(Spinel Compound Oxide Particle)

As the spinel compound oxide particle, the above-described particle can be employed and hence will not be described.

Incidentally, the spinel compound oxide particle may be surface-treated.

This surface treatment can further improve the thermal conductivity of the spinel compound oxide particle.

For example, for the spinel compound oxide particle obtained as described above, a surface-treated layer including an organic compound is caused to adhere to at least a portion of the surface of the spinel compound oxide particle, to thereby produce a surface-treated spinel compound oxide particle.

Specifically, the above-described untreated spinel compound oxide particle and a surface treatment agent that can form a surface-treated layer including an organic compound are mixed, to cause the surface treatment agent to adhere to at least a portion of the surface of the untreated spinel compound oxide particle; subsequently, for example, drying or curing is performed to thereby produce a surface-treated spinel compound oxide particle.

When the surface treatment agent is an organic compound that itself does not have reactivity but has adsorbability, or the surface treatment agent is dissolved or dispersed in a liquid medium to form a solution or a dispersion, drying may be performed in order to promote adsorption or to remove the liquid medium. When the surface treatment agent is an organic compound having reactivity, the reactive group of the compound may be used to achieve curing, to form the above-described surface-treated layer. Incidentally, when the surface treatment agent is caused to adhere to the whole surface of the untreated spinel compound oxide particle, the surface-treated layer covers the untreated spinel compound oxide particle.

Surface Treatment Agent

A surface treatment agent used in the present invention can form a surface-treated layer including an organic compound, and is an organic compound having a site adsorptive or reactive to the spinel compound oxide particle, which is an inorganic compound. Specific examples include surface treatment agents such as organosilane compounds, organotitanium compounds, and organophosphate compounds. Examples of these surface treatment agents include the following.

The organosilane compounds are preferably silane coupling agents. The silane coupling agents are not particularly limited, but examples include vinyltrichlorosilane, vinyltriethoxysilane, vinyltrimethoxysilane, γ-methacryloxypropyltrimethoxysilane, β(3,4epoxycyclohexyl)ethyltrimethoxysilane, γ-glycidoxypropyltrimethoxysilane, hexyltrimethoxysilane, decyltrimethoxysilane, octadecyltrimethoxysilane, γ-glycylmethoxypropylmethyldiethoxysilane, N-β(aminoethyl)γ-aminopropyltrimethoxysilane, N-β(aminoethyl)γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

The organotitanium compounds may be titanium coupling agents. Specific examples of the titanium coupling agents include diisopropoxytitanium bis(triethanolaminate), dihydroxytitanium bislactate, dihydroxy bis(ammoniumlactate) titanium, bis(dioctylpyrophosphate)ethylene titanate, bis(dioctylpyrophosphate)oxyacetate titanate, tri-n-butoxytitanium monostearate, tetra-n-butyl titanate, tetra(2-ethylhexyl) titanate, tetraisopropyl bis(dioctylphosphite) titanate, tetraoctyl bis(ditridecylphosphite) titanate, tetra(2,2-diallyloxymethyl-1-butyl) bis(ditridecyl)phosphite titanate, isopropyl trioctanoyl titanate, isopropyl tricumylphenyl titanate, isopropyl triisostearoyl titanate, isopropylisostearoyldiacrylic titanate, isopropyl dimethacryloylisostearoyl titanate, isopropyl tri(dioctylphosphate) titanate, isopropyl tridodecylbenzenesulfonyl titanate, isopropyl tris(dioctylpyrophosphate) titanate, and isopropyl tri(N-amidoethyl aminoethyl) titanate. Of these, preferred is isopropyl tri(N-amidoethyl aminoethyl) titanate.

A commercially available product of the titanium coupling agents may be PLENACT (registered trademark) manufactured by Ajinomoto Fine-Techno Co., Inc.

Examples of the organophosphate compounds include phosphates, alkylphosphonic acids, and aralkylphosphonic acids. Examples of the phosphates include publicly known phosphates such as a mono- or di-ester of orthophosphoric acid and oleyl alcohol, stearyl alcohol, or the like, and a mixture of the mono- and di-esters.

Examples of the alkylphosphonic acids include phosphonic acids having an alkyl group having 1 to 20 carbon atoms. Specific examples of unsubstituted alkyl groups having 1 to 20 carbon atoms include methyl, ethyl, n-propyl, isopropyl, n-butyl, isobutyl, sec-butyl, tert-butyl, n-pentyl, isopentyl, neopentyl, tert-amyl, 1,2-dimethylpropyl, n-hexyl, cyclohexyl, 1,3-dimethylbutyl, 1-isopropylpropyl, 1,2-dimethylbutyl, n-heptyl, 2-heptyl, 1,4-dimethylpentyl, tert-heptyl, 2-methyl-1-isopropylpropyl, 1-ethyl-3-methylbutyl, n-octyl, tert-octyl, 2-ethylhexyl, 2-methylhexyl, 2-propylhexyl, n-nonyl, isononyl, n-decyl, isodecyl, n-undecyl, isoundecyl, n-dodecyl, isododecyl, n-tridecyl, isotridecyl, n-tetradecyl, isotetradecyl, n-pentadecyl, isopentadecyl, n-hexadecyl, isohexadecyl, n-heptadecyl, isoheptadecyl, n-octadecyl, isooctadecyl, n-nonadecyl, isononadecyl, n-icosyl, isoicosyl, cyclopentyl, cyclohexyl, cyclooctyl, cyclododecyl, and 4-methylcyclohexyl. A substituent of such an alkyl group is preferably an inactive group. Preferred examples of the substituent include alkoxy groups, halogen atoms, a formyl group, acyl groups, a carboxyl group, a cyano group, a nitro group, and a sulfo group.

Examples of the aralkylphosphonic acids include phosphonic acids having an aralkyl group (alkyl group substituted with an aryl group) having 7 to 20 carbon atoms. Examples of unsubstituted aralkyl groups having 7 to 20 carbon atoms include benzyl, phenethyl, 2-phenylpropan-2-yl, styryl, cinnamyl, diphenylmethyl, and triphenylmethyl.

The treatment method using the surface treatment agent may be publicly known and commonly used methods; examples include a spraying process using a fluid nozzle, dry processes using, for example, stirring with a shearing force, a ball mill, or a mixer, and wet processes using, for example, an aqueous or organic solvent. The surface treatment using a shearing force is desirably performed so as not to destroy the filler.

The system internal temperature in such a dry process using a surface treatment agent and the temperature of drying or curing after the treatment in such a wet process are appropriately determined in accordance with the species of the surface treatment agent so as to be in a range where thermal decomposition does not occur. For example, heating is desirably performed at temperatures of 80 to 230° C.

The amount of nonvolatile content or cured product of the surface treatment agent in the surface-treated layer relative to an untreated spinel compound oxide particle is not particularly limited; however, relative to 100 parts by mass of the untreated spinel particle, the nonvolatile content or cured product in the surface treatment agent is preferably set to 0.01 to 10 parts from the above-described viewpoint of improving functions such as thermal conductivity.

Whether or not an unknown spinel compound oxide particle corresponds to a surface-treated spinel compound oxide particle according to the present invention can be determined in the following manner: for example, regarding the surface of the unknown spinel compound oxide particle or an extract obtained by, for example, immersing or boiling the spinel compound oxide particle in a solvent in which the nonvolatile content or cured product of the surface treatment agent is dissolvable, whether or not an index that is the presence of chemical structures corresponding to the surface treatment agent itself or the cured product thereof, silicon atoms, titanium atoms, or phosphorus atoms can be observed by infrared absorption analysis (IR) or atomic absorption spectrometry (AA).

When the surface-treated layer is caused to adhere to at least a portion of the surface of the untreated spinel compound oxide particle, the resin included in the resin composition exhibits improved wettability, to provide improved adhesion to the spinel compound oxide particle. This suppresses generation of voids that tend to be formed in the surface of the spinel compound oxide particle. Thus, a reduction in the loss of thermal conductivity is achieved, to thereby, for example, improve the thermal conductivity of the molded article of the resin composition. Such technical advantages are provided when a surface treatment agent composed of an organic compound or a surface-treated layer composed of a cured product of the surface treatment agent adheres to a portion of the surface of the spinel compound oxide particle. The technical advantages are not provided when, for example, firing is performed after the surface treatment to remove the surface treatment agent from the spinel compound oxide particle.

The spinel compound oxide particles may be a single species having a single average particle size, or may be a combination of two or more species having different average particle sizes. In the case of using a combination of two or more species having different average particle sizes, gaps between large particles are filled with medium particles or small particles to facilitate formation of a packing structure. As a result, an increase in the number of non-surface-treated or surface-treated spinel compound oxide particles contained in the resin is achieved, so that more thermal conduction paths are provided to achieve higher thermal conductivity. In the case of using a plurality of species of spinel compound oxide particles having different average particle sizes, one or more species among the plurality of species may be spinel compound oxide particles having a surface-treated layer.

The spinel compound oxide particle may be used in combination with another inorganic filler.

Another Inorganic Filler

In the preparation of a resin composition according to the present invention, as long as advantages of the present invention are not degraded, in addition to the non-surface-treated or surface-treated spinel compound oxide particle, an untreated spinel particle or another surface-treated or non-surface-treated inorganic filler may be contained. The inorganic filler may be publicly known and commonly used inorganic fillers; examples include conductive powders of gold, platinum, silver, copper, nickel, palladium, iron, aluminum, stainless steel, or graphite (black lead), and non-conductive powders of silicon oxide, silicon nitride, aluminum nitride, boron nitride, aluminum borate, aluminum oxide, spinel, magnesium oxide, magnesium carbonate, or diamond. Such inorganic fillers may be used alone or in combination of two or more thereof.

The spinel compound oxide particle content relative to the mass of the composition is preferably 10 to 95 mass %, more preferably 30 to 90 mass %. When the spinel compound oxide particle content is 10 mass % or more, the spinel compound oxide particles efficiently exhibit high thermal conductivity, which is preferred. On the other hand, when the spinel compound oxide particle content is 95 mass % or less, a resin composition having high moldability can be obtained, which is preferred.

(Resin)

The resin is not particularly limited; examples include thermoplastic resins and thermosetting resins.

The thermoplastic resins are publicly known and commonly used resins used for molding materials, for example. Specific examples include polyethylene resins, polypropylene resins, polymethyl methacrylate resins, polyvinyl acetate resins, ethylene-propylene copolymers, ethylene-vinyl acetate copolymers, polyvinyl chloride resins, polystyrene resins, polyacrylonitrile resins, polyamide resins, polycarbonate resins, polyacetal resins, polyethylene terephthalate resins, polyphenylene oxide resins, polyphenylene sulfide resins, polysulfone resins, polyethersulfone resins, polyether ether ketone resins, polyarylsulfone resins, thermoplastic polyimide resins, thermoplastic urethane resins, polyamino bismaleimide resins, polyamide-imide resins, polyetherimide resins, bismaleimide triazine resins, polymethylpentene resins, fluororesins, liquid crystal polymers, olefin-vinyl alcohol copolymers, ionomer resins, polyacrylate resins, acrylonitrile-ethylene-styrene copolymers, acrylonitrile-butadiene-styrene copolymers, and acrylonitrile-styrene copolymers. At least one thermoplastic resin is selected and used; depending on the purpose, two or more thermoplastic resins may be used in combination.

The thermosetting resins are resins characterized by, during curing by means such as heating, radiation, or a catalyst, being turned substantially insoluble and infusible. Examples include publicly known and commonly used resins used for molding materials, for example. Specific examples include novolac-type phenol resins such as phenol novolac resins and cresol novolac resins; phenol resins such as resol-type phenol resins such as unmodified resol phenol resins, and oil-modified resol phenol resins modified with tung oil, linseed oil, or walnut oil, for example; bisphenol epoxy resins such as bisphenol A epoxy resins and bisphenol F epoxy resins; novolac-type epoxy resins such as aliphatic chain-modified bisphenol epoxy resins, novolac epoxy resins, and cresol novolac epoxy resins; epoxy resins such as biphenyl epoxy resins and polyalkylene glycol epoxy resins; resins having a triazine ring such as urea resins and melamine resins; vinyl resins such as (meth)acrylic resins and vinyl ester resins; unsaturated polyester resins, bismaleimide resins, polyurethane resins, diallyl phthalate resins, silicone resins, resins having a benzooxazine ring, and cyanate ester resins. The thermosetting resins may be polymers, oligomers, or monomers.

The above-described thermosetting resin may be used together with a curing agent. In this case, the curing agent may be used in a publicly known and commonly used combination with the thermosetting resin. For example, when the thermosetting resin is an epoxy resin, any compound ordinarily used as a curing agent may be used; examples include amine compounds, amide compounds, acid anhydride compounds, and phenol compounds. Specific examples of the amine compounds include diaminodiphenylmethane, diethylenetriamine, triethylenetetramine, diaminodiphenylsulfone, isophoronediamine, imidazole, $BF_3$-amine complex, and guanidine derivatives; specific examples of the amide compounds include dicyandiamide and polyamide resins synthesized from linolenic acid dimer and ethylenediamine; specific examples of the acid anhydride compounds include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride; specific examples of the phenol compounds include phenol novolac resins, cresol novolac resins, aromatic hydrocarbon formaldehyde resin-modified phenol resins, dicyclopentadienephenol adduct resins, phenolaralkyl resins (Xylok resins), polyhydric phenol novolac resins synthesized from a polyhydric hydroxy compound represented by a resorcin novolac resin and formaldehyde, naphthol aralkyl resins, trimethylolmethane resins, tetraphenylolethane resins, naphthol novolac resins, naphthol-phenol co-condensed novolac resins, naphthol-cresol co-condensed novolac resins, and polyhydric phenol compounds such as biphenyl-modified phenol resins (polyhydric phenol compounds in which phenolic nuclei are linked via bismethylene groups), biphenyl-modified naphthol resins (polyhydric naphthol compounds in which phenolic nuclei are linked via bismethylene groups), aminotriazine-modified phenol resins (polyhydric phenol compounds in which phenolic nuclei are linked via, for example, melamine or benzoguanamine), and alkoxy group-containing aromatic ring-modified novolac resins (polyhydric phenol compounds in which phenolic nuclei and alkoxy group-containing aromatic rings are linked via formaldehyde). Such curing agents may be used alone or in combination of two or more thereof.

In the resin composition according to the present invention, the amounts of the thermosetting resin and the curing agent added are not particularly limited. However, for example, when the curable resin is an epoxy resin, from the viewpoint that good cured product characteristics are provided, the curing agent is preferably used in such an amount that the amount of active group is 0.7 to 1.5 equivalents relative to 1 equivalent of the total amount of epoxy groups of the epoxy resin.

As needed, in the resin composition according to the present invention, the thermosetting resin may be used appropriately in combination with a curing accelerator. For example, when the curable resin is an epoxy resin, various curing accelerators may be used, such as phosphorus-based compounds, tertiary amines, imidazole, organic acid metallic salts, Lewis acids, and amine complex salts.

As needed, in the present invention, the thermosetting resin may be used appropriately in combination with a curing catalyst such as a publicly known and commonly used thermal polymerization initiator or an actinic-energy-ray polymerization initiator.

The above-described resin is more preferably, from the viewpoint of high dimensional stability and high heat resistance, a combination of an epoxy resin and a curing agent, or a polyphenylene sulfide resin. In particular, the resin is most preferably the combination of an epoxy resin and a curing agent because the highest absolute value of thermal conductivity is provided.

The resin content relative to the mass of the composition is preferably 5 to 90 mass %, more preferably 10 to 70 mass %. When the resin content is 5 mass % or more, the resultant resin composition has high moldability, which is preferred. On the other hand, when the resin content is 90 mass % or less, the resultant resin composition can be molded to provide a compound having high thermal conductivity, which is preferred.

(Applications)

In one embodiment of the present invention, the resin composition according to this embodiment is used for a thermal conductive material.

As described above, as thermal conductive materials, alumina has often been used from the viewpoint of costs, and other materials such as boron nitride, aluminum nitride, magnesium oxide, and magnesium carbonate have also been used. On the other hand, since spinel particles are known to have lower thermal conductivity than alumina, use of spinel particles instead of alumina has not been considered.

However, the spinel compound oxide particle according to this embodiment has a large crystallite size in the [111] plane, and hence has high thermal conduction performance. In particular, the spinel compound oxide particle has a thermal conductivity higher than the thermal conductivity (about 30 W/(m·K)) of alumina. Thus, the resin composition according to this embodiment is suitably used for a thermal conductive material.

In an embodiment, the spinel compound oxide particle obtained by the above-described production method has a particle size on the order of micrometers (1000 µm or less) and has a large crystallite size, hence has high dispersibility in resin. Thus, the resin composition can exhibit even higher thermal conductivity.

In another embodiment, the spinel compound oxide particle obtained by the above-described production method is a polyhedral particle synthesized by the flux method and having its own shape, and not obtained by pulverizing an amorphous particle, hence has high smoothness and high dispersibility in resin. Thus, the resin composition can have very high thermal conductivity.

In addition, the spinel compound oxide particle is also applicable to jewelry, catalyst carriers, adsorbents, photocatalysts, optical materials, heat-resistant insulating materials, substrates, and sensors.

<Molded Article>

An embodiment of the present invention provides a molded article formed by molding the above-described resin composition.

The molded article contains the spinel compound oxide particle according to the present invention having high thermal conductivity. Thus, the molded article is preferably used as an insulating heat-dissipation member. This enables improvements in the heat dissipation function of the device, and contributes to devices provided so as to have a smaller size, a smaller weight, and higher performance.

According to another embodiment of the present invention, the molded article can also be used for a low-permittivity member, for example. The spinel particle has low permittivity, to contribute to radio frequency circuits provided so as to have advanced communication functions.

EXAMPLES

Hereinafter, the present invention will be described further in detail with reference to Examples. However, these descriptions do not limit the present invention. Examples will be described on the basis of mass unless otherwise specified.

<Synthesis Example 1> Synthesis of Raw Material, Molybdenum-Containing α-Aluminum Oxide (A-1)

A mortar was used to mix 50 parts by mass of γ-alumina (manufactured by STREM CHEMICALS, Inc., average particle size: 40 to 70 µm), and 280 parts by mass of molybdenum trioxide (manufactured by Wako Pure Chemical Industries, Ltd.). The resultant mixture was placed into a crucible, and fired in a kiln of an AMF-2P temperature controller-equipped ceramic electric furnace ARF-100K (ceramic electric furnace, manufactured by Asahi-rika Co., Ltd.) at 1100° C. for 10 hours. The crucible was left to cool to room temperature, then taken out, and the content was washed with 10% aqueous ammonia and ion-exchanged water. Finally, drying was performed at 150° C. for 2 hours, to obtain a blue powder of molybdenum-containing OG-aluminum oxide (A-1). The obtained powder was found to have an average particle size of 40 µm, and the molybdenum content was found to be 1.8 mass % in terms of molybdenum trioxide.

The average particle size, molybdenum content, crystallite size, and crystal peak intensity ratio were evaluated in the following manner (the same applies to Synthesis Examples below.).

<Average Particle Size>

The thermal conductive filler produced was observed with a scanning electron microscope (SEM) to measure the average particle size. Specifically, a surface observation apparatus, VE-9800 (manufactured by Keyence Corporation) was used to measure the average particle size.

<Molybdenum Content>

The thermal conductive filler produced was measured by X-ray fluorescence measurement (XRF) for molybdenum content. Specifically, an X-ray fluorescence analyzer, ZSX100e (manufactured by Rigaku Corporation) was used for the measurement. At this time, the measurement method employed was an FP (function point) method. The measurement conditions were use of EZ scanning, a measurement range of B to U, a measurement diameter of 10 mm, and a sample weight of 50 mg. Incidentally, the powder itself was measured during which, in order to prevent scattering, a polypropylene (PP) film was used.

<Crystallite Size>

The spinel compound oxide particles produced were measured for the crystallite size in the [111] plane. Specifically, an X-ray diffractometer, SmartLab (manufactured by Rigaku Corporation) was used and a detector, a high-intensity high-resolution crystal analyzer (CALSA) (manufactured by Rigaku Corporation), was used for the measurement. An analysis software, PDXL, was used for the analysis. At this time, the measurement method was an X-ray powder diffraction method; the analysis was performed with the CALSA function of the PDXL; the crystallite size in the [111] plane was calculated using the Scherrer equation from the half width of a peak appearing at 2θ=about 19°. Incidentally, the measurement conditions were the 2θ/θ method, a tube voltage of 45 kV, a tube current of 200 mA, a scanning speed of 0.05°/min, a scanning range of 10 to 70°, a step of 0.002°, and βs=20 rpm. The apparatus standard width was set to 0.026°, which was calculated using a standard silicon powder produced by National Institute of Standards and Technology (NIST, 640d).

Example 1

Synthesis of Spinel Compound Oxide Particles (F-1)

A mortar was used to dry-mix 1.00 part by mass of the molybdenum-containing α-aluminum oxide (A-1) synthesized in Synthesis Example 1, and 0.80 parts by mass of zinc oxide (manufactured by Wako Pure Chemical Industries, Ltd.) (zinc element: 0.01 mol). The resultant mixture was placed into an alumina crucible, and heated in the air atmosphere at a heating rate of 10° C./min to 1500° C. After the lapse of 12 hours, natural cooling achieved cooling to room temperature, to produce spinel compound oxide particles (B-1). Incidentally, the molar ratio (molybdenum element/zinc element) of the molybdenum element of the molybdenum compound to zinc of the zinc oxide was in the range of 0.01 to 2.0.

In the obtained spinel compound oxide particles (F-1), the average particle size was found to be 45 μm, the molybdenum content was found to be 0.30 mol %, and the crystallite size in the [111] plane was found to be 150 nm. The presence of zinc atoms in the spinel compound oxide was confirmed by X-ray fluorescence element analysis (XRF).

Example 2

Synthesis of Spinel Compound Oxide Particles (F-11)

Into an alumina crucible, 1.00 part by mass (aluminum element: 19.6 mmol) of aluminum oxide (manufactured by Wako Pure Chemical Industries, Ltd.), 0.80 parts by mass (zinc element: 9.8 mmol) of zinc oxide (manufactured by Wako Pure Chemical Industries, Ltd.), and 2.22 parts by mass (molybdenum element: 15.5 mmol) of molybdenum trioxide (manufactured by Wako Pure Chemical Industries, Ltd.) were charged, and heated in the air atmosphere at a heating rate of 10° C./min at 1500° C. Subsequently, the content was heated at 1500° C. for 12 hours, and subjected to natural cooling to room temperature, to obtain a powder sample.

The obtained sample was washed with 10% aqueous ammonia, subsequently with water, to remove residual zinc molybdate in the sample, to produce spinel compound oxide particles (F-11). Incidentally, at the time of charging of the raw materials, the molar ratio (molybdenum element/zinc element) of molybdenum of the molybdenum trioxide to zinc of the zinc oxide was in the range of 0.01 to 2.0.

In the obtained spinel compound oxide particles (F-11), the average particle size was found to be 45 μm, the molybdenum content was found to be 0.30 mol %, and the crystallite size in the [111] plane was found to be 200 nm. The presence of zinc atoms in the spinel compound oxide was confirmed by X-ray fluorescence element analysis (XRF).

Example 3

Synthesis of Spinel Compound Oxide Particles (F-2)

The same method as in Example 1 was performed except that the zinc oxide was replaced by 1.02 parts by mass (strontium element: 0.01 mol) of strontium oxide (manufactured by Wako Pure Chemical Industries, Ltd.), to produce spinel compound oxide particles (F-2). Incidentally, at the time of charging of the raw materials, the molar ratio (molybdenum element/strontium element) of the molybdenum element of the molybdenum compound to strontium of the strontium oxide was in the range of 0.01 to 2.0.

In the obtained spinel compound oxide particles (F-2), the average particle size was found to be 45 μm, the molybdenum content was found to be 0.26 mol %, and the crystallite size in the [111] plane was found to be 150 nm. In the spinel compound oxide, the presence of strontium atoms was confirmed by X-ray fluorescence element analysis (XRF).

Example 4

Synthesis of Spinel Compound Oxide Particles (F-3)

The same method as in Example 1 was performed except that the zinc oxide was replaced by 0.79 parts by mass (cobalt element: 0.01 mol) of tricobalt tetraoxide (manufactured by Wako Pure Chemical Industries, Ltd.), to produce spinel compound oxide particles (F-3). Incidentally, at the time of charging of the raw materials, the molar ratio (molybdenum element/cobalt element) of the molybdenum element of the molybdenum compound to cobalt of the tricobalt tetraoxide was in the range of 0.01 to 2.0.

In the obtained spinel compound oxide particles (F-3), the average particle size was found to be 45 μm, the molybdenum content was found to be 0.30 mol %, and the crystallite size in the [111] plane was found to be 150 nm. In the spinel compound oxide, the presence of cobalt atoms was confirmed by X-ray fluorescence element analysis (XRF).

Example 5

Synthesis of Surface-Treated Spinel (MF-11)

To a 500 mL separable flask equipped with a thermometer, a stirrer, and a reflux condenser under nitrogen gas purging, 100 parts by mass of the spinel compound oxide particles (F-11) synthesized in Example 2, 0.5 parts by mass of water, and 100 parts by mass of octanol were added and stirred. To the slurry, 0.5 parts by mass of octadecylpropyltrimethoxysilane was added. The slurry was heated to 100° C., stirred for 10 hours, subsequently filtered off, and washed with toluene. The resultant filtration cake was dried at 200° C. for 2 hours, to obtain surface-treated spinel compound oxide particles (MF-11) in which the cured product of the silane compound adhered to at least portions of the surfaces of the spinel compound oxide particles.

Example 6

Synthesis of Surface-Treated Spinel (MF-12)

To a 500 mL separable flask equipped with a thermometer, a stirrer, and a reflux condenser under nitrogen gas purging, 100 parts by mass of the spinel compound oxide particles (F-11) synthesized in Example 2, 0.5 parts by mass of water, and 100 parts by mass of octanol were added and stirred. To the slurry, 0.5 parts by mass of vinyltrimethoxysilane was added. The slurry was heated to 100° C., stirred for 10 hours, subsequently filtered off, and washed with toluene. The resultant filtration cake was dried at 200° C. for 2 hours, to obtain surface-treated spinel compound oxide particles (MF-12) in which the cured product of the silane compound adhered to at least portions of the surfaces of the spinel compound oxide particles.

Comparative Example 1

Synthesis of Spinel Compound Oxide Particles (HF-1)

A mortar was used to dry-mix 1.00 part by mass of aluminum oxide (manufactured by Wako Pure Chemical Industries, Ltd.) and 0.80 parts by mass (zinc element: 0.01 mol) of zinc oxide (manufactured by Wako Pure Chemical Industries, Ltd.). The resultant mixture was charged into an alumina crucible, and heated in the air atmosphere at a heating rate of 10° C./min to 1000° C. After the lapse of 6 hours, natural cooling achieved cooling to room temperature, to produce spinel compound oxide particles (HF-1).

In the obtained spinel compound oxide particles (HF-1), the average particle size was found to be 10 µm, the molybdenum content was found to be 0 mol %, and the crystallite size in the [111] plane was found to be 50 nm. The presence of zinc atoms in the spinel compound oxide was confirmed by X-ray fluorescence element analysis (XRF).

Example 7

A thermoplastic resin that was 29.7 parts by mass of DIC-PPS LR100G (X-1, manufactured by DIC Corporation, polyphenylene sulfide resin, density: 1.35 g/cm3), and 70.3 parts by mass of the spinel compound oxide particles (F-1) produced in Synthesis Example 2 were uniformly dry-blended, and subsequently subjected to melt-kneading treatment using a resin melt-kneader LABO PLASTOMILL under conditions of a kneading temperature of 300° C. and a number of revolutions of 80 rpm, to obtain a polyphenylene sulfide resin composition in which the fill factor of the thermal conductive filler was 50 vol %. The filler content (vol %) of the resin composition was calculated from the density of the thermoplastic resin and the density of the thermal conductive filler.

(Method of Measuring Thermal Conductivity of Thermoplastic Resin Composition)

The obtained resin composition was placed into a mold and subjected to thermal press molding at a processing temperature of 300° C., to produce a press-molded article having a thickness of 0.5 mm. From the produced press-molded article, a 10 mm×10 mm sample was cut out, and measured with a thermal conductivity measurement apparatus (LFA 467 HyperFlash, manufactured by NETZSCH-Geratebau GmbH) for thermal conductivity at 25° C. A case where the thermal conductivity was 1.9 W/m·K or more was evaluated as Excellent; a case where the thermal conductivity was more than 1.7 W/m·K and less than 1.9 W/m·K was evaluated as Good; and a case where the thermal conductivity was less than 1.6 W/m·K was evaluated as Poor.

Examples 8 to 12 and Comparative Example 2

As in Example 7, polyphenylene sulfide resin compositions having a fill factor of 50 vol % were produced in mixing proportions described in the following Table 1, and were measured for thermal conductivity.

TABLE 1

| | Resin composition Resin/Particle (g) | Compound oxide particle | Metal species | Crystallite size nm | Thermal conductivity W/mk | Density ratio |
|---|---|---|---|---|---|---|
| Example 7 | 29.7/70.3 | F1 | Zn | 150 | 1.7 | 99 |
| Example 8 | 29.7/70.3 | F11 | Zn | 200 | 1.9 | 99 |
| Example 9 | 37.5/62.5 | F3 | Sr | 150 | 1.6 | 99 |
| Example 10 | 31.0/69.0 | F4 | Co | 150 | 1.6 | 99 |
| Example 11 | 29.7/70.3 | MF11 | Zn | 200 | 2.0 | 99 |
| Example 12 | 29.7/70.3 | MF12 | Zn | 200 | 2.0 | 99 |
| Comparative Example 2 | 29.7/70.3 | HF1 | Zn | 50 | 1.1 | 95 |

The above-described results have demonstrated that the resin molded articles obtained by molding thermoplastic resin compositions prepared from specified spinel compound oxide particles according to the present invention exert higher heat dissipation than the existing resin molded article obtained by molding the thermoplastic resin composition prepared from the compound oxide particles not containing molybdenum and having a crystallite size of 100 or less.

Comparison between Example 8 and Examples 11 and 12 has demonstrated the following: the resin molded articles obtained with the spinel compound oxide particles having surface-treated layers composed of cured products of the organosilane compounds have even higher thermal conductivity and exert higher heat dissipation than the resin molded article similarly obtained with the untreated spinel compound oxide particles not having the surface-treated layers composed of the cured products of the organosilane compounds.

INDUSTRIAL APPLICABILITY

The spinel compound oxide particles according to the present invention have large crystallite sizes in the predetermined crystal plane, and hence have higher thermal conductivity. Molded articles obtained from the spinel compound oxide particles and resin can be used as insulating heat-dissipation members, to enable improvements in the heat dissipation function of devices, to contribute to devices provided so as to have a smaller size, a smaller weight, and higher performance. The molded articles are also applicable to, for example, low-permittivity members; the spinel particles have low permittivity, to contribute to radio frequency circuits provided so as to have advanced communication functions. In addition, the spinel compound oxide particles are also applicable to, for example, jewelry, catalyst carriers, adsorbents, photocatalysts, optical materials, heat-resistant insulating materials, substrates, and sensors.

The invention claimed is:

1. A spinel compound oxide particle comprising: metallic atoms, aluminum atoms, oxygen atoms, and molybdenum atoms,
   wherein the metallic atoms are selected from the group consisting of zinc atoms, cobalt atoms, and strontium atoms,
   wherein the molybdenum content of the spinel compound oxide particle is 20 mol % or less relative to the spinel compound oxide, and
   a crystallite size in a plane is 100 nm or more.

2. The spinel compound oxide particle according to claim 1, further comprising a surface-treated layer.

3. A resin composition comprising the spinel compound oxide particle according to claim 1 and a resin.

4. A molded article formed from the resin composition according to claim 3.

5. A resin composition comprising the spinel compound oxide particle according to claim 2 and a resin.

6. A molded article formed from the resin composition according to claim 5.

7. A method for producing the spinel compound oxide particle comprising: metallic atoms, aluminum atoms, oxygen atoms, and molybdenum atoms,
   wherein the metallic atoms are selected from the group consisting of zinc atoms,
   cobalt atoms, and strontium atoms, and
   a crystallite size in a [111] plane is 100 nm or more;
   the method comprising:
   a step (1) of firing a first mixture (A-1) including a molybdenum compound and a metallic-atom-containing compound or a first mixture (A-2) including a molybdenum compound, a metallic-atom-containing compound, and an aluminum compound to prepare an intermediate; and
   a step (2) of firing, at a temperature higher than a temperature selected in the step (1), in a case of using the mixture (A-2), a second mixture including the intermediate, or, in a case of using the mixture (A-1), a second mixture including the intermediate and an aluminum compound, to produce the spinel compound oxide particle,
   wherein the metallic-atom-containing compound is selected from the group consisting of zinc-containing compounds, cobalt-containing compounds, and strontium-containing compounds.

8. The production method according to claim 7, wherein a molar ratio of a molybdenum element of the molybdenum compound to a metallic element of the metallic-atom-containing compound is 0.01 to 2.0.

9. The method for producing the spinel compound oxide particle according to claim 7, wherein the spinel compound oxide particle further comprises a surface-treated layer formed by surface treating the spinel compound oxide particle.

10. A method for producing the spinel compound oxide particle comprising: metallic atoms, aluminum atoms, oxygen atoms, and molybdenum atoms,
    wherein the metallic atoms are selected from the group consisting of zinc atoms,
    cobalt atoms, and strontium atoms, and
    a crystallite size in a [111] plane is 100 nm or more;
    the method comprising:
    a firing step of subjecting a metallic-atom-containing compound and an aluminum compound in the presence of molybdenum atoms to solid solution formation and crystal formation to cause crystal growth to the spinel compound oxide particle; and
    a cooling step of crystallizing the spinel compound oxide particle provided by the crystal growth in the firing step,
    wherein the metallic-atom-containing compound is selected from the group consisting of zinc-containing compounds, cobalt-containing compounds, and strontium-containing compounds.

11. The method for producing the spinel compound oxide particle according to claim 10, wherein the spinel compound oxide particle further comprises a surface-treated layer formed by surface treating the spinel compound oxide particle.

12. The production method according to claim 10, wherein a molar ratio of a molybdenum element of the molybdenum compound to a metallic element of the metallic-atom-containing compound is 0.01 to 2.0.

* * * * *